July 10, 1934.  H. E. TAUTZ  1,965,728
LATHE
Filed Aug. 9, 1933   2 Sheets-Sheet 2
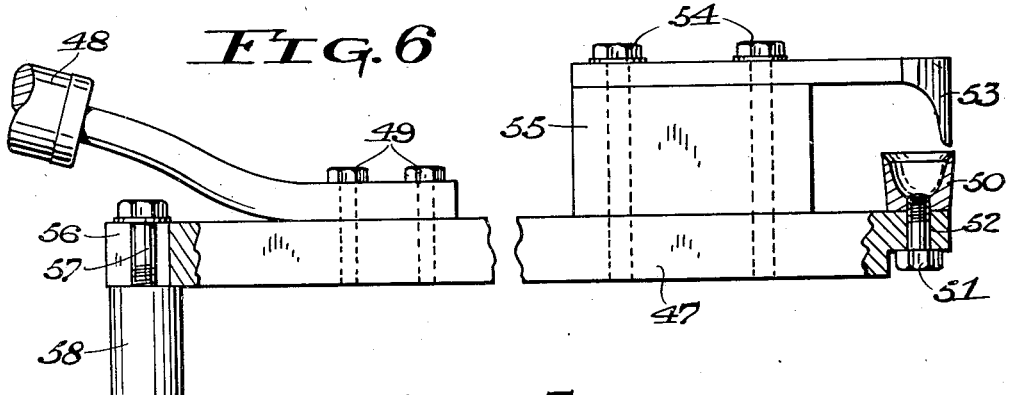
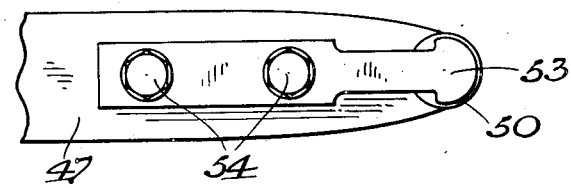
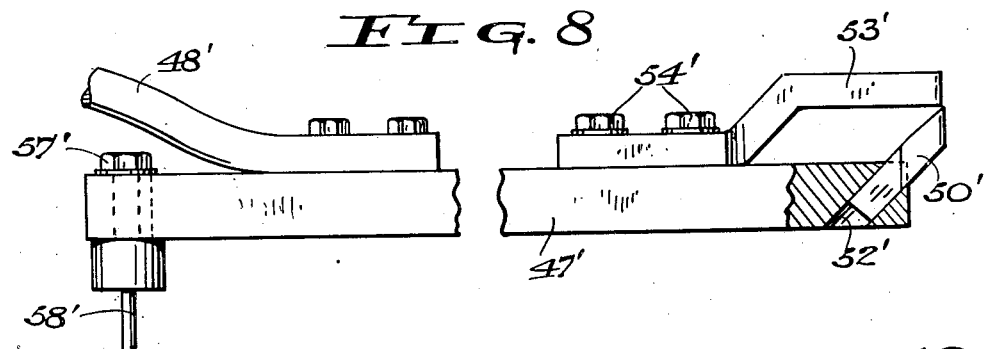
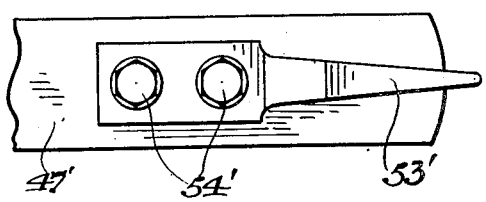
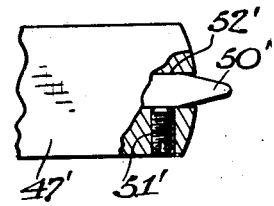
WITNESSES  
INVENTOR  
Herbert E. Tautz  
ATTORNEY Patented July 10, 1934

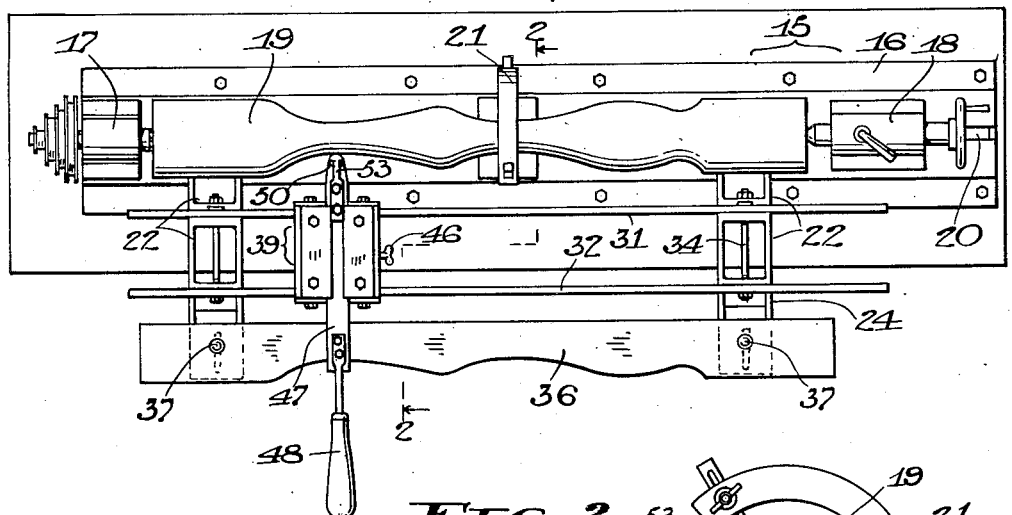

1,965,728

UNITED STATES PATENT OFFICE 1,965,728

LATHE

Herbert E. Tautz, Milwaukee, Wis., assignor to The Delta Manufacturing Company, Milwaukee, Wis., a corporation of Wisconsin Application August 9, 1933, Serial No. 684,323

2 Claims. (Cl. 142—38)

The invention relates to lathes and to duplicating devices for use on lathes.

An object of the invention is to provide for use on a wood-turning lathe an adjustable demountable duplicating device of a simple and durable construction by means of which turned pieces can be rapidly and accurately reproduced, the device preventing chattering and permitting unobstructed use of an open-front steady rest through which a tool on the device may be passed.

Another object of the invention is to perfect details of construction generally.

The invention further consists in the several features hereinafter described and claimed.
In the accompanying drawings:

Fig. 1 is a top plan view of a wood-turning lathe equipped with the duplicating device of the invention.

Fig. 2 is a transverse sectional elevation taken along the line 2—2 of Fig. 1.

Fig. 3 is a detail plan view of the lathe, parts being broken away and parts being shown in section.

Fig. 4 is a detail sectional view taken along the line 4—4 of Fig. 3.

Fig. 5 is a detail view of a bracket.

Fig. 6 is a detail side view of one of the lathe tools, parts being broken away and parts being shown in section.
Fig. 7 is a top view of the tool of Fig. 6.

Fig. 8 is a side view of another form of tool, parts being broken away and parts being shown in section.

Fig. 9 is a top view of the tool of Fig. 8, and Fig. 10 is a detail view, partly in section, of the tool of Fig. 8.

In these drawings, 15 designates a wood-turning lathe of any suitable construction having the usual bed 16 supporting a head stock 17 and movable tail stock 18 for mounting a work piece 19 between the lathe centers. The lathe bed 16 is provided with the customary longitudinal slot 20 at its upper face to facilitate attachment of the tool rests and other accessories. For springy work, a steady rest 21, preferably of the open-front type, is adjustably secured to the upper face of the lathe bed, as by means of a bolt 21' passing through the slot 20.

A pair of spaced brackets 22 are demountably secured to the lathe bed 16 and each is preferably formed by a pair of adjustably connected sections 23 and 24. Each bracket section 23 rests on the upper flat face of the lathe bed and is attached thereto by a clamping bolt 25 passing through the lathe bed slot 20 and provided with a wing nut 26. The clamping bolt 25 extends through a key hole opening 27 formed in the bracket section 23 to permit quick attachment and detachment of the bracket without removing the bolt from the lathe bed. The bracket section 23 has a pair of lugs 28 on its lower face to slidably fit in the slot 20 for accurately locating the bracket. The bracket section 24 is clamped to the section 23 by horizontal bolts 29 which selectively fit in a series of bores 30 to permit vertical adjustment of the section 24 for lathes of different swing.

The spaced bracket sections 24 are connected by a pair of spaced parallel bars 31 and 32 arranged in parallel relation to the axis of the lathe. The bars are provided with a series of openings 33 for receiving horizontal bolts 34 by which the bars are adjustably clamped to the brackets, the bolts passing through parts of the brackets. The distance between the brackets may be varied according to the length of the work piece. In some cases the tail stock may be placed between the brackets.

The outer ends of the bracket sections 24 are formed with respective horizontal ledges 35 for supporting thereon a template 36 having a profile which is to be reproduced in the finished work. The template is adjustably clamped to the ledges 35 by bolts 37 passing through slots 38 in the ledges.

The bars 31 and 32 form ways or tracks for slidably supporting thereon a carriage 39. The carriage comprises a rectangular metal block 40 resting on the upper edges of the bars and having a bottom groove 41 in which fits the bar 31. Hook plates 42 and 43 are secured by screws 44 to the opposite ends of the block 40 to engage the bottom edges of the bars 31 and 32. In its travel the carriage may pass the bracket sections 24, and may be withdrawn from the ends of the bars 31 and 32.

A cross groove 45 is formed in the upper face of the block 40 to guide therein either of a pair of tools hereinafter described, the groove being overlaid by retaining plates 45' to form a T-slot. A wing screw 46 is threaded into the block for clamping the tool. The hook plates 42 and 43 are notched at their upper edges to provide clearance for the tool.

The tool shown in detail in Figs. 6 and 7 comprises a flat bar 47 adapted to slidably fit in the carriage groove 44, and having a handle 48 secured to an end portion thereof by screws 49. The other end of the bar is reduced in width and thickness and carries on its upper face a cup-shaped cutting member 50 secured by a screw 51 passing through a bore 52 in the bar. The cutting member diverges slightly toward its upper cutting edge and may be turned to different positions to obtain fresh cutting portions. The cutting member is of such character that it can be easily and accurately sharpened. A cut-limiting guard 53 is preferably provided for the cutting member and is secured to the bar 47 by screws 54 passing through a spacing block 55. The guard end is spaced a short distance above the cutting member and is of semicircular shape slightly smaller in diameter than the cutting member. The handle end of the bar 47 has a vertical slot 56 through which passes a screw 57 adjustably securing in place a depending cylindrical guide member 58 having substantially the same diameter as the cuting member. The guide member is adapted to abut against the profiled edge of the template 36 and thus determine the profile of the work piece. The cutting edge of the tool is preferably engageable with the work at or slightly below the horizontal central plane of the work.

For many classes of work the tool above described is sufficient, but it is occasionally desirable to have a second tool capable of cutting sharper recesses. This tool is shown in detail in Figs. 8 to 10 and comprises a bar 47' adapted to slidably fit in the carriage groove 44. The bar carries a handle 48' at one end and at the other end is provided with an inclined bore 52' in which a pointed cutting member 50' is secured by a set screw 51'. The handled end of the bar 47' is vertically slotted to receive a screw 57' adjustably securing in place a depending guide member 58', the lower end of which is reduced in diameter to abut against the profiled edge of the template 36 for determining the profile of the finished work piece.

To arrange the lathe for duplicating work pieces, it is only necessary to clamp the brackets 22 to the lathe bed, to clamp the bars 31 and 32 to the brackets, to mount the carriage 40 on the bars, and to secure the template 36 on the brackets. If the steady rest 21 is desired, it can readily be mounted on the lathe bed at any appropriate time without interfering with the bracket mounting.

In operation, the tool bearing the cutter member 50 is slid endwise into the carriage groove 44 and is advanced into the work a suitable depth. The set screw 46 is then tightened and the carriage is moved along the bars 31 and 32. The operation is then repeated until the high points of the work are reached, whereupon the same operation is performed with shorter strokes of the carriage. When the steady rest is needed, it is adjusted to a turned section of the work. The tool may pass freely through the open front of the steady rest. Eventually, with the set scrcew loose, the guide member 58 slidably abuts against the profiled edge of the template 36 to limit the cutting movement of the tool and to determine the profile of the work. The tool is then withdrawn from the carriage and the other pointed tool is used if the character of the work requires it. Succeeding work pieces turned on the lathe in a similar manner will be accurate duplicates of the first. If the template is shifted transversely of the lathe bed between turning operations, the work pieces will have the same profile but will be of different diameters. If the work piece is to be conical or tapered shape a straight-edge template is used, and if a cylindrical work piece is desired no template is necessary, but the set screw is tightened. The tool is supported in such manner that chattering is avoided, and the turned pieces can be rapidly and accurately duplicated, even by unskilled persons. When the lathe is to be used in the ordinary way, the brackets 22 can be quickly removed from the lathe bed.

What I claim as new and desire to secure by Letters Patent is:—

1. An attachment for a lathe having a bed with a longitudinal slot in its upper surface, comprising a pair of brackets resting on said surface and projecting laterally of the bed, means passing through said slot for clamping said brackets to the bed at an adjustable distance apart, a track adjustably connecting said brackets, and a tool carriage slidably mounted on said track.

2. An attachment for a lathe, comprising a pair of spaced brackets adapted for securement to a lathe bed, a pair of spaced parallel track bars connecting said brackets and having a plurality of pairs of registering openings, a bolt passing through a pair of said registering openings for clamping said bars to an interposed portion of each bracket, and a tool carriage slidably resting on said track bars.

HERBERT E. TAUTZ.